United States Patent [19]
Bice et al.

[11] Patent Number: 6,052,505
[45] Date of Patent: Apr. 18, 2000

[54] FIBER CURVATURE MEASUREMENT FIXTURE

[75] Inventors: Chester L. Bice, Powder Springs; Norvel R. Branham, Stone Mountain; Andrew Lewis Ingles, Alpharetta, all of Ga.

[73] Assignee: Lucent Technologies Inc., Murray Hill, N.J.

[21] Appl. No.: 09/144,190

[22] Filed: Aug. 31, 1998

[51] Int. Cl.[7] ............................................. G02B 6/00
[52] U.S. Cl. ........................ 385/136; 385/134; 385/137; 385/97; 264/1.25
[58] Field of Search .................... 385/134–139, 385/83, 97–99; 264/1.24, 1.25; 356/345

[56] References Cited

U.S. PATENT DOCUMENTS

| | | | |
|---|---|---|---|
| 4,379,771 | 4/1983 | Snyder | 385/134 |
| 4,623,156 | 11/1986 | Moisson et al. | 385/137 |
| 5,182,789 | 1/1993 | Nash-Stevenson et al. | 385/137 |
| 5,917,595 | 6/1999 | Norland et al. | 385/82 |

*Primary Examiner*—Hemang Sanghavi

[57] ABSTRACT

A fixture for use in a fiber curl measurement assembly has a fiber guide plate upon which are disposed a pair of fiber locating and centering rods which form a V-groove for containing the fiber, which is free to rotate within the groove. A reference plate having a transverse reference edge in space from the downstream end of the V-groove a distance sufficient for fiber curvature to be measured during rotation. A rotating stage under control of a motor has a rotatable plate upon which rests, and is held, a fiber clip for containing the fiber to be measured. The rotating stage is oriented at a vertical angle to the plane of the rods and V-groove, and the fiber is threaded through a bearing block into the V-groove. The bend thus created in the fiber is such that a downward force is created on the fiber to hold it within the V-groove. Thus, where the rotating stage is rotated by the motor, the fiber within the groove is rotated so that curl measurements may be made. The diameter of each of the rods is such that the fiber is cammed into the V-groove during the threading operation.

21 Claims, 11 Drawing Sheets

FIBER CURVATURE MEASUREMENT FIXTURE

FIELD OF THE INVENTION

This invention relates to the measurement of optical fiber curvature or curl, and, more particularly, to a fixture for holding the optical fiber under test during measurement of the curl.

BACKGROUND OF THE INVENTION

Fiber curl is the inherent tendency of a length of uncoated fiber to exhibit some degree of curvature. Heretofore, such curvature has not presented a problem inasmuch as connections to or splicing of, most optical fibers has been on an individual fiber basis, generally using active alignment devices. However, because of the enormous increase in the use of optical fibers for communications signal transmissions, it has been necessary to find ways of treating, e.g., splicing, fibers en masse. Thus, there have evolved passive alignment technologies which optimize fiber alignment for groups of fibers, such as ribbon cables. The random orientation of the curvature of individual fibers within such a ribbon can cause misalignment of fibers in the mass splicing operation. The problem of such misalignment is exacerbated in the field, where the technician lacks the necessary equipment to correct for it. As a consequence, fiber manufactures have sought ways to quantify and control the amount of curvature in their fibers in order that end users of the fiber can be assured that fiber curl will not adversely impact the splicing efficiency or yields of their mass splices. In addition, monitoring of fiber curl during the manufacturing process helps to supply a feedback to the operators of the up-stream processes in the fiber fabrication, thus making it possible to minimize yield losses resulting from too great fiber curl by adjusting these processes to reduce curl.

As a prerequisite for quantiignd and controlling fiber curl, a method for measuring such curl is necessary. In the prior art there have been numerous arrangements for determining or, more particularly, measuring fiber curl, as exemplified by one such method as shown and described in an article entitled "Straightening Out the Fiber Curl Problem", by J. Farro and K. Erng, Photonics Spectra, September 1993, at pages 102 through 108. The apparatus shown therein comprises a V-groove holder such as a vacuum chuck, or a ferrule, for holding the fiber under test on a constant axis that allows rotation of the fiber through three hundred and sixty degrees (360°). The fiber may be rotated either manually or by a stepping motor arrangement which rotates a fiber holder relative to the ferrule or vacuum chuck. Fiber deflection from the axis as it is rotated is measured by, for example, a viewing microscope or some type of optical measuring instrument, such as a laser micrometer. Additionally, an image analysis system, a video camera and monitor, or a video analyzer and computer may be used. To make the measurements, the fiber is placed in the ferrule or vacuum chuck with a ten to twenty millimeter (10–20 mm) overhang. As the fiber is rotated, as by the stepping motor, preferably in fifteen degree (15°) increments, the magnitude of the fiber excursions is measured. The data obtained are fitted to a sine function to determine peak-to-peak amplitude, which indicates, by proper calculation, the radius of curvature of the fiber. With the overhang known, and the maximum deflection measured, the fiber's radius of curvature can be obtained from a simple circular model. Such an arrangement has been used to determine the radius of curvature or of large numbers of fibers with good or satisfactory accuracy.

However, while the method discussed, or variations thereof, is in wide use because of its relative simplicity, the apparatus presents certain problems which, in a production environment, can be costly. For example, the vacuum chuck constantly draws dirt particles into its fiber holding groove. This problem is mentioned in the foregoing Farro and Ernig article. The apparatus must be shut down periodically while the chuck is cleaned. As a result of dirt accumulating in the grooves, the vacuums' force decreases and the fiber is not held at a constant axis, thereby inducing measurement errors. Additionally, each time a new fiber is to be introduced into the apparatus, the vacuum force must be cut off while the fiber is placed in the chuck groove.

The use of a ferrule in place of a vacuum chuck introduces different problems. The fiber must be inserted slowly and rotated gently during insertion to avoid breakage, which is a tedious, tiring and slow process for the operator. If a fiber break occurs within the ferrule, it is quite difficult to remove it because of the extremely small diameters involved. Thus, each of the accepted methods of holding the fiber presents its own problems, with the net result of slowdowns and interruptions in the production process.

SUMMARY OF THE INVENTION

The present invention is a fiber holding and rotating fixture for use in fiber curl measurements that is easy to use and that is not subject to most of the problems of the prior art devices. More particularly, the fixture comprises a base member having an axis and upon which is mounted a reference plate having a straight knife edge normal to the axis. Axially spaced from the knife edge is a guide plate having a shoulder on the top surface thereof that extends parallel to the axis. First and second longitudinal magnetic guide pins rest on the top surface and abut each other, with one of the guide pins magnetically held against the shoulder and the two pins magnetically held together. The line of abutment or contact of the pins with each other defines an axial groove for containing the optical fiber. The guide plate has retaining members for holding the pins in place longitudinally while the pins are held in contact with each other by the magnetic force. A hinged lid is adapted to bear against the tops of the guide pins without interfering with a fiber in the axial groove.

An angled bearing block has a rotating stage and a grooved pulley extending therefrom which are axially aligned with the guide pin groove at an angle thereto. The rotating stage is a flat member having a longitudinally extending guide shoulder for aligning a fiber holding clip and having a motor mount extending from one side of the bearing block on which a motor is mounted. A fiber guide is mounted to the rotating stage and passes through the angled bearing block on an axis normal thereto and alignment with the guide pin groove, so that fiber passed through the guide is aligned with, and, as will be discussed more fully hereinafter, rests in the groove formed by the two guide pins. The knife edge of the reference plate is spaced from the point where the fiber exits the groove a distance of, for example, twenty millimeters (20 mm) and the knife edge serves as a reference mark for the point of measurement on the fiber. In operation, the rotating stage rotates the fiber clip and the fiber contained therein so that deviations of the free end of the fiber from the axis can be measured in steps through three hundred and sixty degrees, and the necessary computations performed to determine fiber curl.

The fixture of the present invention is, as will become apparent, easy to use, substantially eliminates the problems of breakage and accumulated dirt, and requires no unusual skill or dexterity on the part of the operator. Production shut down times are, as a consequence, minimized, with attendant economic benefit.

DETAILED DESCRIPTION

Figure 1:
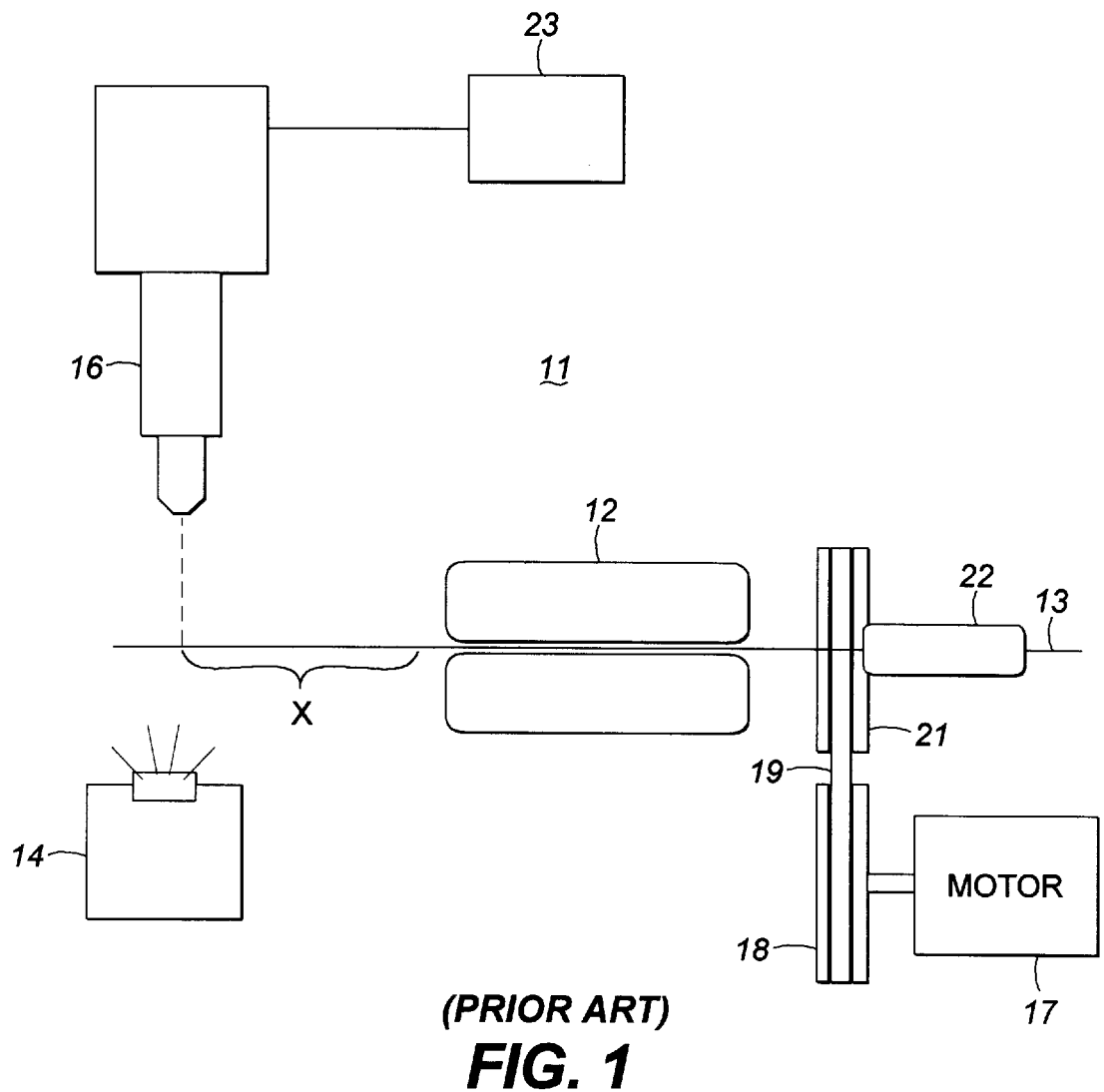
FIG. 1 is a diagrammatic depiction of prior art arrangement for determining fiber curl.

As discussed hereinbefore, an uncoated, unconstrained length of optical fiber can have sufficient curvature to cause serious alignment problems in automated mass fusion splicing equipment. The mass splicing techniques, which require the alignment of as many as twenty-four (24) fiber ends (twelve splices) can tolerate only limited offset between fiber ends. Typically, a mass fusion splicer has a fiber unconstrained distance of about three millimeters (3 mm) and can tolerate a fiber end which is offset about three and one-half microns (3.5 µm) from where a perfectly straight fiber would be. If an accurate determination of the radius of curvature of the fiber is made, this condition can be met. The technique for such determination involves measuring the fiber's offset at a point approximately twenty millimeters (20 mm) from the point where the fiber becomes unconstrained, i.e. a distance x, rotating the fiber through three hundred and sixty degrees (360°) and viewing the fiber end movement transverse to the axis of rotation and viewing the fiber end transverse to the axis of rotation to obtain the maximum offset y. The radius of curvature R is then given by $$R = \frac{(x^2 + y)}{2y} \quad (1)$$

In FIG. 1 there is shown diagrammatically, an apparatus 11 for making these measurements. Apparatus 11 comprises a fixture 12 for holding the fiber sample 13 with an unconstrained length x of 20 mm. Fixture 12 may comprise, in prior art systems, a ceramic ferrule as shown, or a vacuum chuck, or other type of holding device that is rotatable or that permits rotation of the fiber. A white light source 14 supplies illumination for a CCD camera 16 or other reviewing device.

The shaft of a stepping motor 17 is connected through a pulley 18 and belt 19 to a second pulley 21 upon which is mounted, and revolvable therewith, a fiber holder 22. The fiber holding fixture 12 has a longitudinal bore having a diameter of approximately 127 microns into which is inserted the fiber 13. In practice the fiber sample may be approximately six inches long, with approximately four inches of the coating removed.

In operation, the sample is rotated one full revolution in nine degree (9°) increments so that the transverse image of the fiber may be viewed and the axial offset observed and recorded. A simple calculation of one-half the highest and lowest offset gives the value y in Equation (1), and the radius R can be readily determined. Alternatively, y can be obtained by fitting a sine wave to the offset fiber centers. A computer or other processing unit 23 may be used to analyze the video image.

Figure 2:
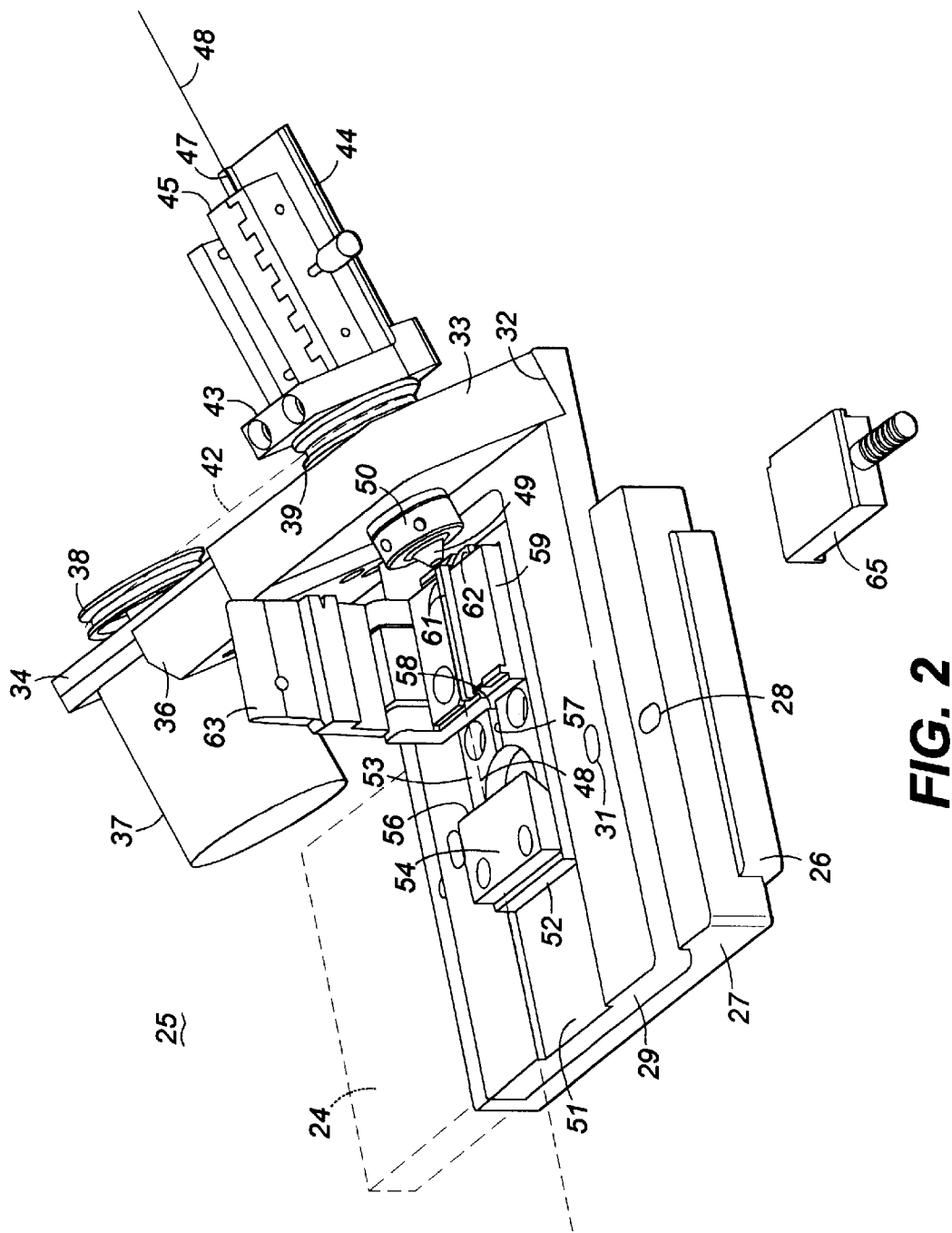
FIG. 2 is a perspective view of the fiber curvature measuring fixture of the present invention.
Figure 3:
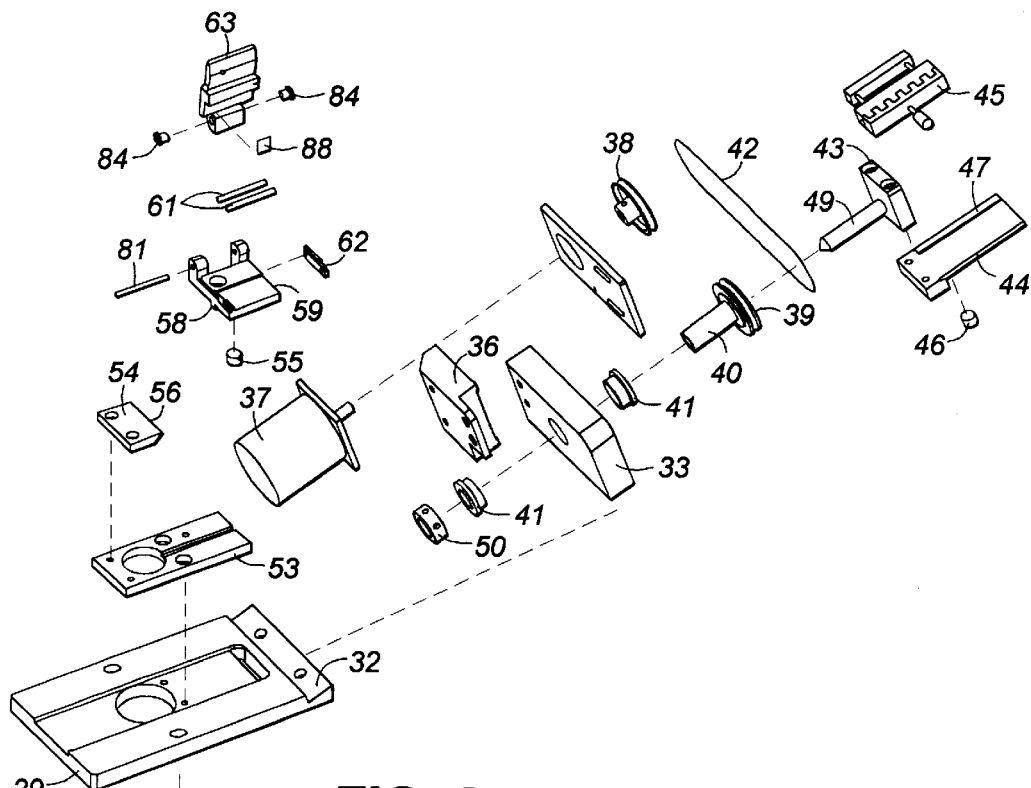
FIG. 3 is an exploded perspective view of the fixture of FIG. 2.

As was pointed out hereinbefore, prior art fiber holding devices or fixtures 12 have been somewhat less than completely satisfactory. In FIGS. 2 and 3 there is shown the holding fixture 25 of the invention for use in a measuring system as shown in FIG. 1 while, as will be apparent hereinafter, is a substantial improvement over the prior art. Fixture 25 comprises a scope plate 26 and scope knee 24 upon which may be mounted a viewing microscope, not shown. A Y-saddle member 27 straddles plate 26, and is affixed thereto by, for example, bolts (not shown) through bolt holes 28 which are elongated to allow alignment adjustments. Y-saddle member 27 has mounted thereon an X-stage plate member 29, affixed thereto by bolts (not shown) through bolt holes 31, also elongated for adjustments. As seen in FIGS. 2 and 3, one end of plate member 29 has an angled surface 32 upon which is mounted a bearing block 33, upon one end of which is a motor plate 34 which, in turn, supports a motor arm 36 and step motor 37. The shaft of motor 37 extends, for example, through a bushing, not shown, through motor plate 34 and terminates in a pulley 38. A second pulley 39 is spaced from pulley 38 and has a hollow shaft 40, which extends, in bushing 41, through bearing block 33 and is aligned with the centerline or axis of the fixture 25. Pulley 39 is driven by pulley 38 and hence motor 37 by means of endless belt 42. Mounted on the face of pulley 39 and rotatable therewith is a guide member 43 which has affixed thereto a rotatable plate 44. Member 43 and plate 44 together form a rotating stage for holding a standard fiber clip 45, which is held in place on plate 44 by means of one or more magnets 46 contained in plate 44. Means 47 on plate 44 aligns the fiber clip 45 so that a fiber 48 held thereby is aligned with the axis of the fixture 25. As will be more apparent hereinafter, the fiber 48 is passed through a fiber guiding member such as an extended nose portion 49 of guide member 43 which is held against longitudinal movement by means of a lock collar 50. As thus far described, in operation, the rotating stage with the fiber clip 45 in place thereon and a fiber in the clip rotates the clip and fiber, so that the fiber 48 emerging from nose 49 rotates.

Mounted in a groove 51 in X-stage plate 29 is a guide stage 52 which comprises a first guide plate 53 having mounted thereon a reference plate 54 which has a reference knife edge 56 extending transverse to the axis of the fixture 25. Plate 53 has a longitudinally extending slot 57 for receiving a tongue member 58 on the bottom of a second guide plate 59 for axially aligning it. As will be more clearly seen hereinafter, the top surface of plate 59 receives and aligns two metallic guide pins 61 which are held in place by means of one or more magnets 55, and which are held in place longitudinally by rod keeper 62. Pins 61 are forced together by the magnetic attraction to form a longitudinal fiber receiving groove aligned with the axis of the fixture 25. A hinged closure plate 63 bears against the upper surfaces of the pins 61 when it is closed and functions to maintain the fiber 48 within the groove. Plate 59 has a downstream end spaced from knife edge 56, and an upstream end adjacent the front face of bearing block 33. A set-up gage 65 is used to align and space the component parts of the apparatus 25.

FIG. 3, which is an exploded perspective view of the fixture 25, makes clear the relationships of the various components, and, in most cases, their configurations. For simplicity, the numerous bolts or other holding or mounting devices have not been shown.

Figure 4:
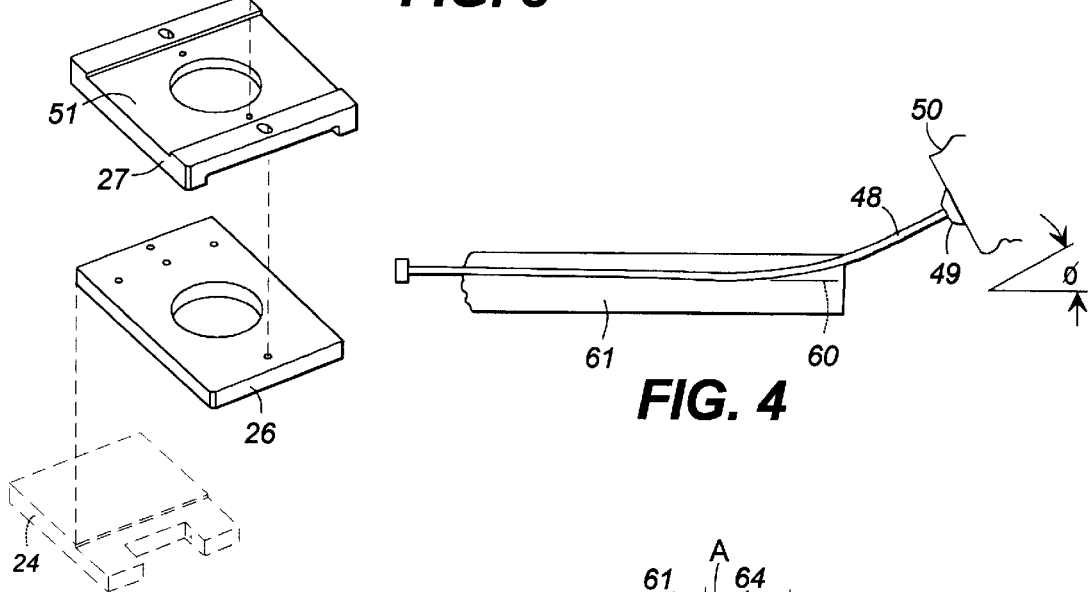
FIG. 4 is an exploded perspective view of the fixture of FIG. 2.
Figure 5:
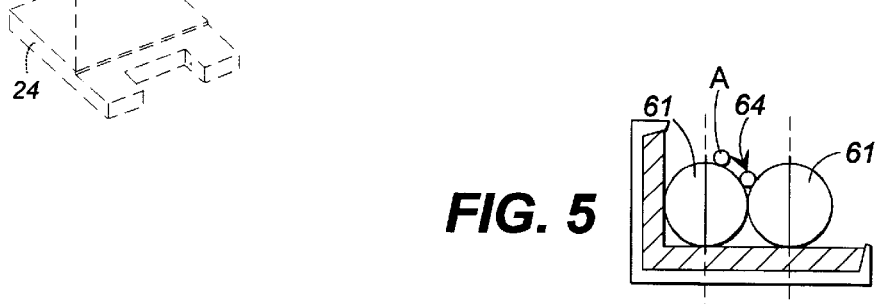
FIG. 5 is a detail of the fiber centering action of a portion of the apparatus of FIGS. 2 and 3.
Figure 6A:
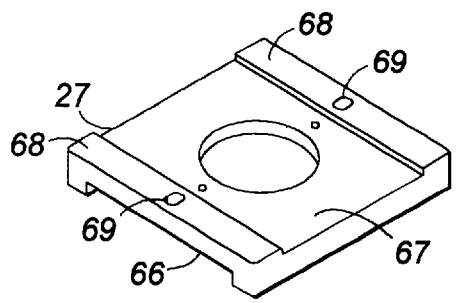
FIGS. 6a through 6d are, respectively, a perspective, a plan, a side elevation, and a rear elevation views of a Y-saddle component of the fixture of FIGS. 2 and 3.
Figure 6B:
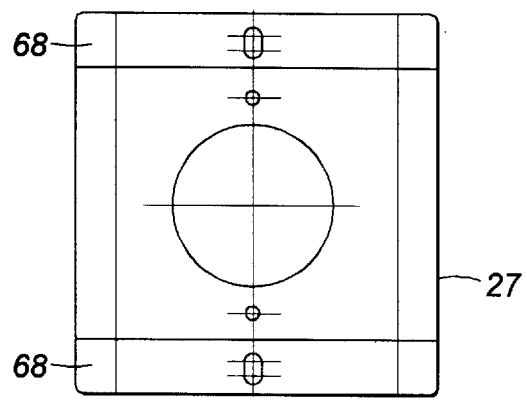
Figure 6C:
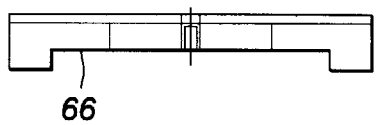
Figure 6D:
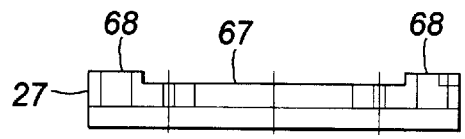
Figure 7A:
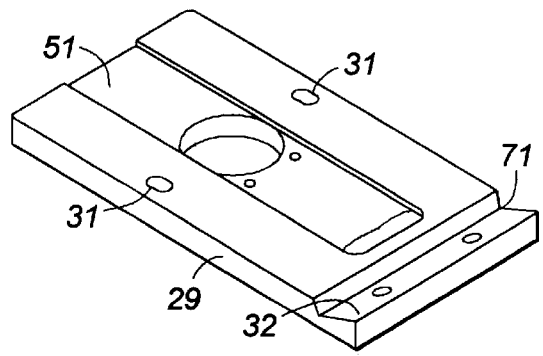
FIGS. 7a through 7d are, respectively, a perspective, a plan, an end elevation, and a side elevation views of an X-stage plate component of the fixture of FIGS. 2 and 3.
Figure 7B:
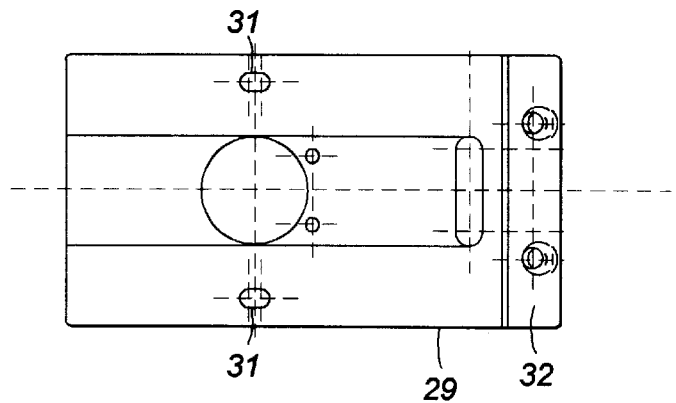
Figure 7C:
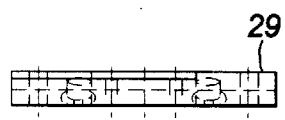
Figure 7D:
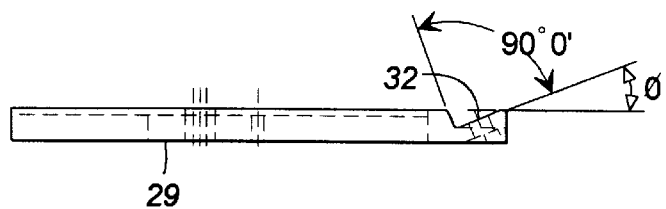
Figure 8A:
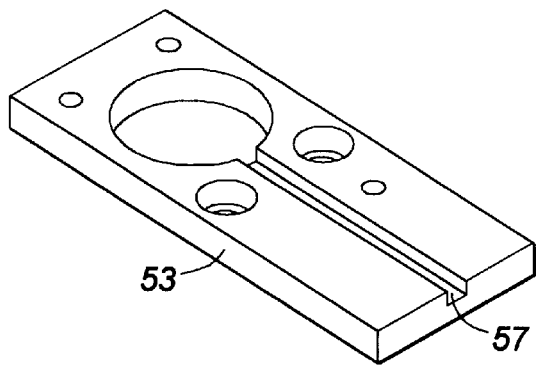
FIGS. 8a through 8d are, respectively, a perspective, a plan, a side elevation, and an end elevation views of a guide stage component of the fixture of FIGS. 2 and 3.
Figure 8B:
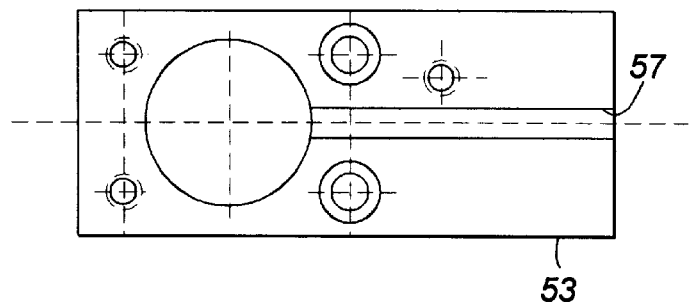
Figure 8C:
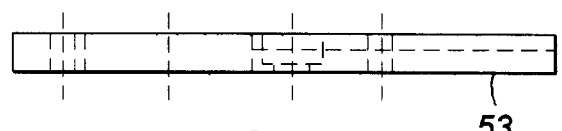
Figure 8D:
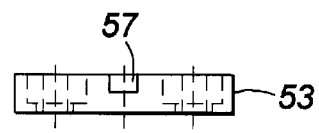

FIGS. 4 and 5 depict the action of the pins or rods 61 on the fiber 48 for centering the fiber 48 and maintaining it in proper alignment during rotation thereof. In FIG. 4, the dashed line 60 represents the line of contact of the two rods 61, thereby forming, in effect, a V-groove 64 as seen in FIG. 5. The end of nose portion 49, from which fiber 48 is emergent, directs the fiber at an angle Ø into V-groove 64 where the inherent stiffness of the fiber 48 is such, as to cause it to bear against the V-groove 64 along its length, as shown in FIG. 4. Thus, fiber 48 may be fed through nose portion 49 of guide member 43 into V-groove 64, where it tends to remain even while being rotated. If, as expected, the fiber 48 has a bend thereon, it may not immediately center itself within V-groove 64, instead riding along the top of one of the rods 61, as shown at A in FIG. 5. As long as the fiber is on the V-groove side of the rod centerline, the fiber will be cammed down into V-groove 64 as it is pushed along the rod 61. This action is similar to, and based upon the same principles as, the arrangement shown in U.S. Pat. No. 5,787,216 of Bice et al. It has been found that excellent results are obtained when the rods 61 are each approximately 0.0625 to 0.0626 inches in diameter, which is approximately twelve to fourteen times the diameter of the fiber which may be, for example, 125 microns (125 $\mu$m). In general, a rod diameter range of eleven to twenty-five times the diameter of the fiber will produce good results. However, the narrower range gives optimum performance.

In operation, a fiber 48 to be tested is inserted into fiber clip 45, which may take any of a number of commercially available forms. The clip 45 is placed upon rotatable plate 44 and the fiber threaded or passed through guide member 43 and nose portion 49, which passes through bearing block 33. As can be seen, bearing block 33 is mounted on x-stage plate 29 at an angle Ø thereto. Fiber 48 is fed forward until it emerges from nose portion 49 and settles into the V-groove 64 formed by the rods 61 in the manner shown in FIGS. 4 and 5. Fiber 48 is fed forward until the end thereof extends above and just beyond the knife edge 56 on reference plate 54, but not in contact therewith. Measurements are then made as the rotating stage formed by guide member 43 and plate 44 is rotated by step motor 37, pulleys 38 and 39, and belt 42, thus rotating fiber 48. The distance x from the ends of rods 61 to knife edge 56 is the distance spanned by the free fiber 48, and is generally in the range of ten to twenty millimeters (10–20 mm), and is the side-to-side movement of this portion of fiber 48 that, when measured, yields to necessary data for determining the radius of curvature, which may be done in a processing unit or computer 23, as shown in FIG. 1. During rotation, fiber 48 is constrained from slipping out of V-groove 64 by means of hinged closure plate 63.

The fixture of the invention thus aligns and restrains the fiber during rotation without the numerous disadvantages of prior art arrangements such as ferrules or vacuum chucks, or other such holding devices of the prior art. The fixture of the invention allows quick and simple insertion of the fiber in proper position, and materially reduces the risk of fiber breakage. Even if a break does occur, the fiber pieces are accessible and easily removed.

FIGS. 6 through 15 are depictions of several of the individual components of the fixture 25 for a clearer understanding of certain aspects of the invention.

FIGS. 6a through 6d depict the Y-saddle member 27 and are perspective, plan, side elevation, and rear elevation views, respectively thereof. Member 27 has, on the bottom thereof, a first groove 66 for receiving a scope plate 26 so that, when assembled, member 27 straddles plate 26, as best seen in FIG. 2. A second groove is formed on the top of member 27 by means of projections 68. Elongated bolt holes 69 are provided for allowing a measure of adjustment when the parts are assembled. Member 27 is preferably made of suitable metal, such as, for example, aluminum.

FIGS. 7a through 7d depict the x-stage plate 29 and are perspective, plan, end elevation, and side elevation views, respectively thereof.

X-stage plate 29, is dimensional to fit within the second groove 67 of Y-saddle member 29, and to be bolted thereto through elongated bolt holes 31. Plate 29 has an elongated groove 51 formed on the top surface thereof for receiving guide stage plate 53, and, at one end thereof, transverse groove 71 have a transversely extending angled surface 32, which is at an angle Ø to the top surface of plate 29. In practice, it has been found that a value of Ø of eighteen to twenty-two degrees (18°–22°) produces excellent results. Plate 29 is preferably made of metallic material such as, for example, aluminum or steel.

The guide stage plate 53 is shown in FIGS. 8a through 8d, which are, respectively, perspective, plan, side elevation, and end elevation views thereof.

Guide stage plate 53 is dimensional to fit within groove 51 of x-stage plate 29. Plate 57, which is preferably of metallic material, such as, for example, aluminum, has a longitudinally extending slot 57 on the top surface thereof for locating and aligning guide plate 59 by means of tongue member 58 on the bottom thereof.

Figure 9A:
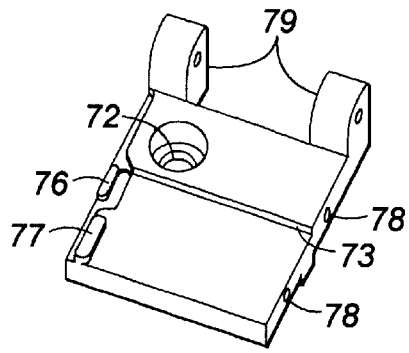
FIGS. 9a through 9e are, respectively, a perspective, a top plan, a front elevation, a bottom plan, and a side elevation views of a guide plate component of the fixture of FIGS. 2 and 3.
Figure 9B:
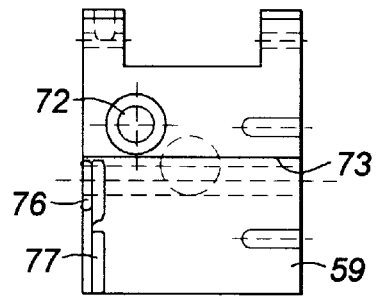
Figure 9C:
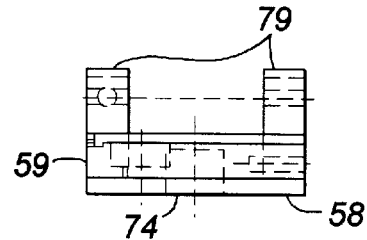
Figure 9D:
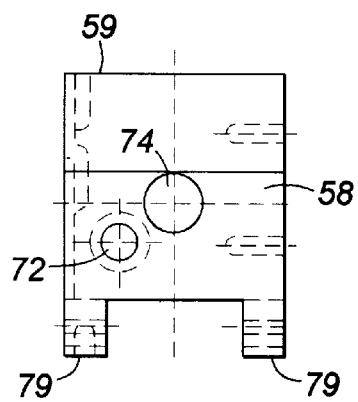
Figure 9E:
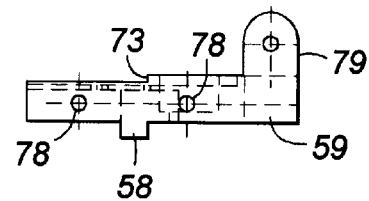
Figure 10A:
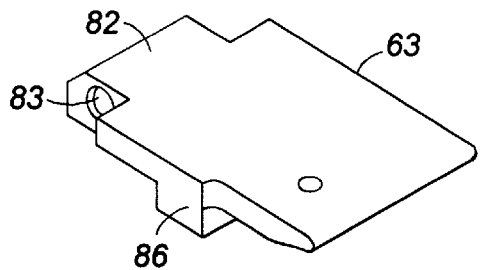
FIGS. 10a through 10d are, respectively, a first perspective, a second perspective, a front elevation and a bottom plan views of a closure plate component of the fixture of FIGS. 2 and 3.
Figure 10B:
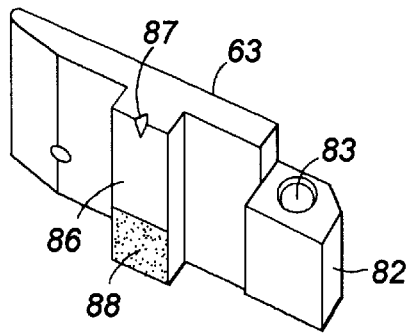
Figure 10C:
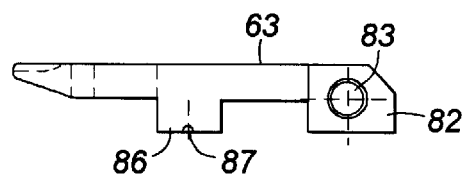
Figure 10D:
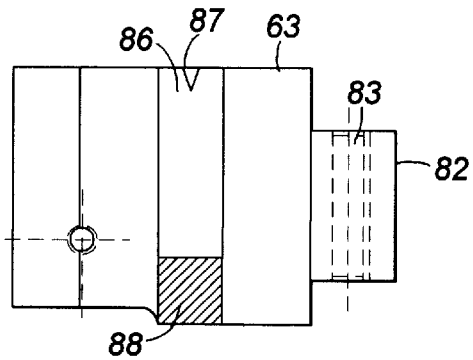
Figure 11A:
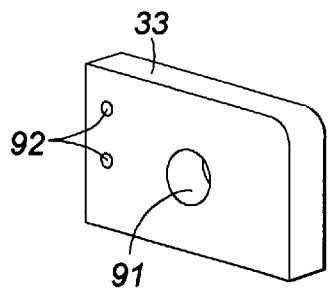
FIGS. 11a through 11d are, respectively, a perspective, a side elevation, a front elevation, and a bottom plan views of a bearing block component of the fixture of FIGS. 2 and 3.
Figure 11B:
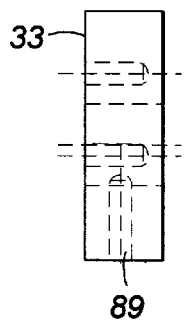
Figure 11C:
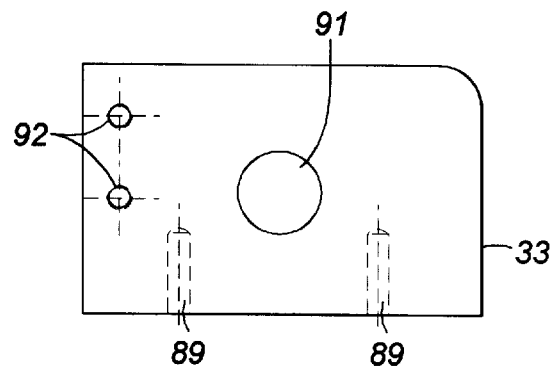
Figure 11D:
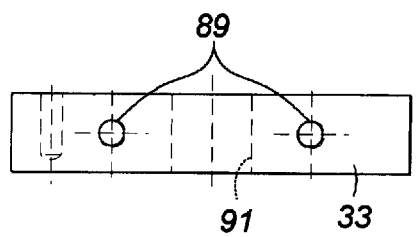
Figure 12A:
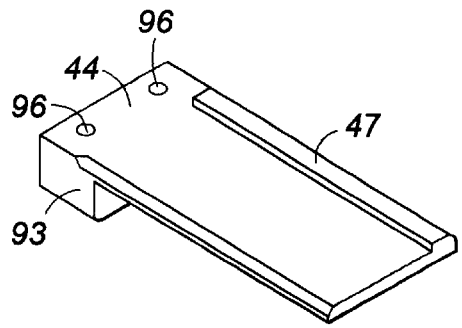
FIGS. 12a through 12e are, respectively, a perspective, a top plan, a side elevation, an end elevation, and a bottom plan views of a rotatable plate component of the fixture of FIGS. 2 and 3.
Figure 12B:
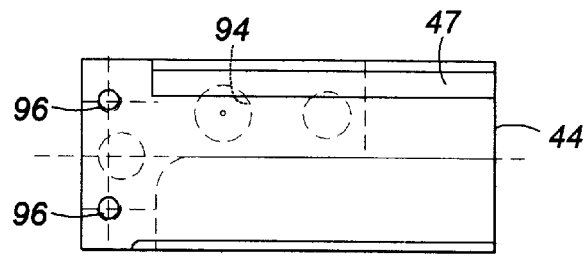
Figure 12C:
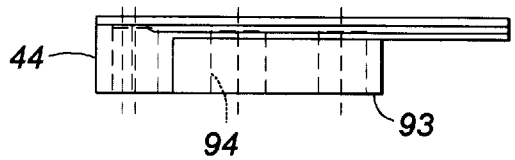
Figure 12D:
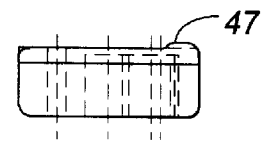
Figure 12E:
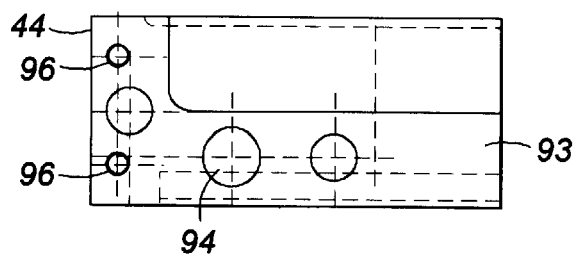

Guide plate 59 is shown in FIGS. 9a through 9e which are, respectively, perspective, top plan, front elevation, bottom plan, and side elevation views thereof. In FIGS. 9b and 9d it can be seen that tongue member 58, which extends along the length of the bottom surface of plate 59 has a centerline which defines, or is coincident with the centerline of the fixture 25 when assembled. Tongue member 58 is dimensioned to fit within longitudinal slot 57 in guide stage plate 53, thereby centering guide plate 59, which is bolted to plate 53 by means of a bolt, not shown, in bolt hole 72. Extending along the top surface is an aligning member comprising a shoulder 73 which is spaced from, and parallel to, the centerline. The distance between shoulder 73 and the centerline is approximately equal to the diameter of a rod or pin 61, which, as shown in FIG. 2, bears against shoulder 73. With both rods 61 in place as shown in FIG. 2, the V-groove 64 formed thereby extends along the centerline. Rods 61 are held against each other and against shoulder 73 by means of magnet 55, shown in FIG. 3, which is housed in a bore 74, the center of which is offset from the centerline with its center roughly aligned with one edge of tongue member 58, and the shoulder 73. The offset position of magnet 55 causes it to pull a first one of the rods 61 of magnetic material firmly against the shoulder 73 and the second rod firmly against the first rod, thereby insuring that the V-groove 64 is properly aligned and firmly positioned. On one side, or end, of plate 59 is a first projecting stop 76 which helps hold the rods 61 in position longitudinally, and a second stop 77 which functions to guide the rods into position during assembly. On the opposite edge of plate 59 are bolt holes 78 which enable rod keeper 62, shown in FIG. 3, to be mounted in position to function as a longitudinal stop for the rods 61. A pair of spaced projecting ears 79 extend from one side of plate 59 above the top surface thereof, as shown, and are bored to receive a hinge pin 81 mounted to hinged closure plate 63. With the rods mounted in this way, they are readily accessible and removable for cleaning or replacement without disturbing the remainder of the fixture.

FIGS. 10a through 10d are a first perspective, a second perspective, a front elevation, and a bottom plan view, respectively, of the closure plate 63. Plate 63 has a rearwardly extending hinge tang 82 which has a bore 83 extending therethrough for receiving hinge pin 81. If desired, bushings 84, shown in FIG. 3, may be used in bore 83 to insure smooth operation of the hinge arrangement. Projecting from the underside of plate 63 and extending from one end to the other thereof is a fiber keeper member 86 which, when plate 63 is in its closed position, bears against the tops of rods 61, thereby keeping the fiber in place within V-groove 64. A notch 87 may be cut into the lower edge of what is the fiber entrance end to minimize possible rubbing of the rotating fiber during operation. Additionally, a fiber restraining means such as a resilient pad 88, preferably of a material such as velvet, may be affixed to keeper 86 at the fiber exit end for keeping the fiber from climbing out or bouncing in the V-groove. Thus, it is made at least partially immune to rough edges in the V-groove or dirt on the fiber. In practice, the plate 63 is in its closed position and assists in grinding the fiber into the V-groove when being inserted. The pad 88 protects the fiber and actually cleans it as it is inserted. Other fiber restraining means, such as a rotatable member, might be used instead of pad 88.

Bearing block 33, which is depicted in FIGS. 11a through 11d which are, respectively, perspective, side elevation, front elevation, and bottom plan views thereof, is adapted to be mounted along its bottom edge on angled surface 32 of x-stage plate 29, as shown in FIG. 2, by means of bolt holes 89 and suitable bolts, not shown. Block 33 has a central bore 91 extending therethrough the centerline of which will be at an angle Ø relative to the surface guide plate 59 when block 33 is affixed to plate 29. Block 33 also has bolt holes 92 for mounting motor arm 36 thereto.

In FIGS. 12a through 12e, which are, respectively, perspective, top plan, side elevation, end elevation, and bottom plan views of the rotatable plate 44 upon which fiber clip 45 is to be carried. Plate 44 has, on the top surface thereof, a longitudinally extending alignment member 47, and, extending from the bottom, a built-out portion 93 for housing one or more magnets 46 in bore 94. As can be seen, magnet 46 is held in position under alignment member 47. As a consequence, when a fiber clip 45, of magnetic material, is placed against alignment member 47, it is held there by magnetic attraction. The spacing of member 47 from the centerline of plate 44 is such that the fiber 48 held by clip 45 will be centered along the operative axis of the fixture. The centerline of plate 44 aligned with the axis of plate 53 and is at the angle Ø relative thereto. Plate 44 also has, at one end thereof, bolt holes 96 for mounting guide member 43 thereto.

Figure 13A:
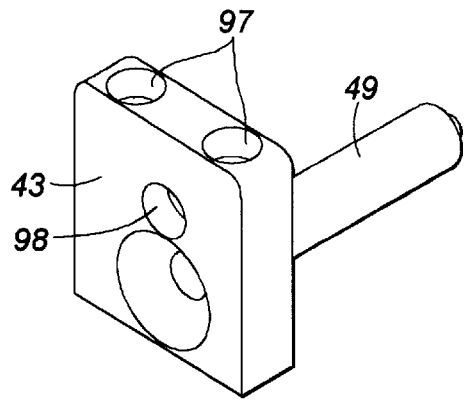
FIGS. 13a through 13d are, respectively, a perspective, a plan, a rear elevation, and a cross-sectional views of a guide member of the fixture of FIGS. 2 and 3.
Figure 13B:
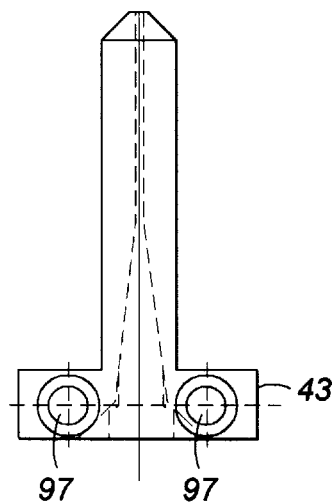
Figure 13C:
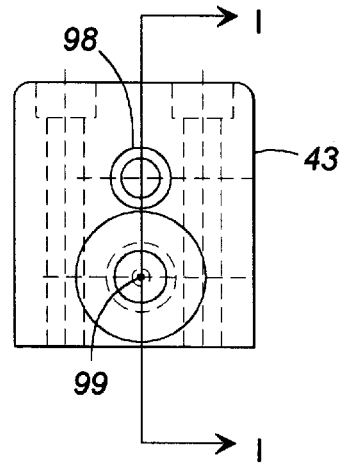
Figure 13D:
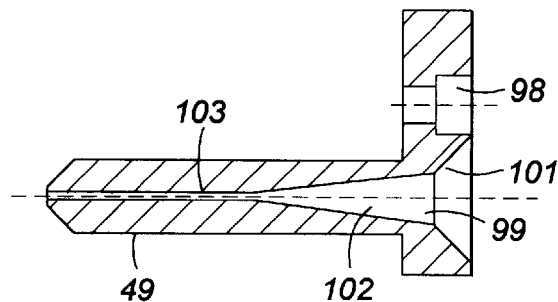

The guide member 43 is shown in FIGS. 13a through 13d which are, respectively, perspective, plan, rear elevation, and cross-sectional views thereof. Member 43 comprises a block of suitable material adapted to be mounted on rotatable plate 44 at one end thereof by means of bolts, not shown, in countersunk bolt holes 97, and the assembly is mounted to pulley 39 by means of bolt hole 98 and a suitable bolt, not shown. Member 43 has extending therefrom a nose portion 49 which, as best seen in FIG. 13d, has a bore 99 extending therethrough. FIG. 13d is a cross-sectional view along the line I—I in FIG. 13c. Bore 99 has a first tapered section 101 and a second tapered section 102 for ease of threading the fiber 48 into the straight section 103 of the bore 99. As discussed hereinbefore, nose portion 49 extends through block 33 in hollow shaft 40, as shown in FIG. 3, and is preferably locked against longitudinal movement by lock collar 50. The centerline of bore 99 is aligned with V-groove 64 so that fiber 48 may be placed and held therein, as shown in FIG. 4. With such an arrangement, the nose portion 49 functions as a fiber holding and guiding device, and the fiber and portion 49 rotate together. Although nose portion 49 bears some resemblance to prior art ferrule arrangements, in those devices the fiber rotates within the ferrule, with a consequent possibility of fiber wear or abrasions, or other damage. Guide member 43 is held in place on pulley 39 by only the one bolt in bolt hole 98. As a consequence, when it, or nose portion 49, becomes dirty or plugged, it may be quickly and easily replaced.

In concluding the detailed description, it should be noted that it will be obvious to those skilled in the art that many variations and modifications may be made to the preferred embodiment without substantial departure from the principles of the present invention. All such variations and modifications are intended to be included herein as being within the scope of the present invention, as set forth in the claims. Furthermore, in the claims, the corresponding structures, materials, acts, and equivalents of all means or step plus function elements are intended to include any structure, material, or acts for performing the functions with other claimed elements as specifically claimed.

We claim:

1. A fiber holding and rotating fixture comprising:
   a first guide plate having a longitudinal axis corresponding to the operative axis of the fixture;
   a second guide plate mounted on said first guide plate and having a top surface and a bottom surface and a downstream end and an upstream end;
   first and second fiber locating rods on said top surface;
   an aligning member for aligning said rods parallel to said longitudinal axis;
   a magnetic member for holding said first rod against said aligning member and for holding said second rod against said first rod to form a longitudinally extending V-groove for receiving and holding optical fiber;
   a reference plate longitudinally spaced from the downstream end of said second plate and the ends of said rods;

a rotatable stage having a centerline parallel to and aligned with the said longitudinal axis and V-groove;

said rotatable stage having a plate member for holding a fiber containing member; and a fiber guiding member extending from said rotatable stage for guiding the fiber into said V-groove.

2. A fiber holding and rotating fixture as claimed in claim 1 wherein said first guide plate has a longitudinal slot aligned with said longitudinal axis and said second guide plate has a longitudinal tongue member extending from the bottom surface thereof and adapted to fit within said longitudinal slot for axially aligning said second guide plate.

3. A fiber holding and rotating fixture as claimed in claim 1 wherein said aligning member comprises a shoulder on said top surface of said second guide plate extending parallel to and spaced from said longitudinal axis.

4. A fiber holding and rotating fixture as claimed in claim 3 wherein each of said rods is cylindrical in shape and has a diameter in the range of eleven to twenty-five times the diameter of the fiber.

5. A fiber holding and rotating fixture as claimed in claim 4 wherein said shoulder is spaced from said longitudinal axis a distance approximately equal to the diameter of one of said rods.

6. A fiber holding and rotating fixture as claimed in claim 5 wherein said magnetic member is mounted in said second guide plate and offset from the centerline there a distance approximately equal to the spacing of said shoulder from said longitudinal axis.

7. A fiber holding and rotating fixture as claimed in claim 1 wherein said second guide plate has a first and second spaced ears projecting therefrom at one side thereof and extending above said top surface, said ears having bores extending therethrough for receiving hinge pins.

8. A fiber holding and rotating fixture as claimed in claim 7 and further comprising a closure plate having an open and a closed position and having a rearwardly extending tang having a bore therein for receiving hinge pins for hingedly attaching said closure plate to said ears.

9. A fiber holding and rotating fixture as claimed in claim 8 wherein said closure plate has a bottom surface from which extends a fiber keeper member for bearing against the tops of said rods when said closure plate is rotated to said closed position.

10. A fiber holding and rotating fixture as claimed in claim 9 wherein a fiber restraining member is mounted on said fiber keeper member.

11. A fiber holding and rotating fixture as claimed in claim 10 wherein said restraining member is a resilient pad.

12. A fiber holding and rotating fixture as claimed in claim 1 and further including an x-stage plate having first and second ends and a longitudinal groove therein for containing said first guide plate, said x-stage plate having a top surface;

said first end having an angled surface at an angle Ø to said top surface and extending transversely of said x-stage plate.

13. A fiber holding and rotating fixture as claimed in claim 12 wherein the angle Ø is approximately 18° to 22°.

14. A fiber holding and rotating fixture as claimed in claim 12 and further including a bearing block member having front and rear faces and a flat edge, said flat edge being mounted on said angled surface.

15. A fiber holding and rotating fixture as claimed in claim 14 wherein said bearing block member has a substantially centered bore extending therethrough from said rear face to said front face, the centerline of said bore being substantially aligned with said longitudinal axis at the angle Ø thereto when said bear block is mounted on said angled surface.

16. A fiber holding and rotating fixture as claimed in claim 15 wherein a pulley having a hollow shaft is rotatably mounted in said bore.

17. A fiber holding and rotating fixture as claimed in claim 16 wherein said rotatable stage is mounted to said pulley.

18. A fiber holding and rotating fixture as claimed in claim 17 wherein said fiber guiding member extends through said hollow shaft to the front face of said bearing block.

19. A fiber holding and rotating fixture as claimed in claim 17 wherein said plate member of said rotatable stage includes an alignment member for aligning the fiber holding member.

20. A fiber holding and rotating fixture as claimed in claim 19 and further including a magnetic member for holding the fiber holding member against said alignment member.

21. A fiber holding and rotating fixture as claimed in claim 17 and further including apparatus for rotating said pulley.

* * * * *